F. MOCKLI.
Dough-Kneaders and Cutters.

No. 149,946. Patented April 21, 1874.

WITNESSES:
E. Wolff
Sedgwick

INVENTOR:
F. Möckli
BY
ATTORNEYS.

UNITED STATES PATENT OFFICE.

FRANK MÖCKLI, OF GALVESTON, TEXAS.

IMPROVEMENT IN DOUGH KNEADERS AND CUTTERS.

Specification forming part of Letters Patent No. 149,946, dated April 21, 1874; application filed February 14, 1874.

*To all whom it may concern:*

Figure 1:
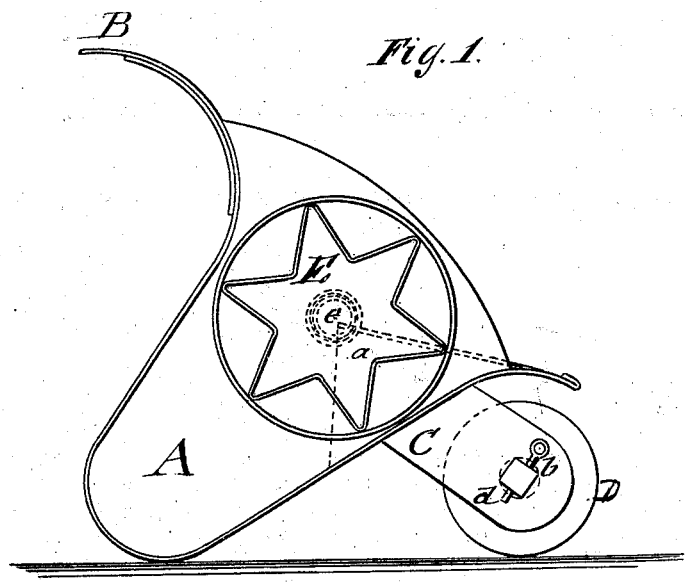
Figure 2:
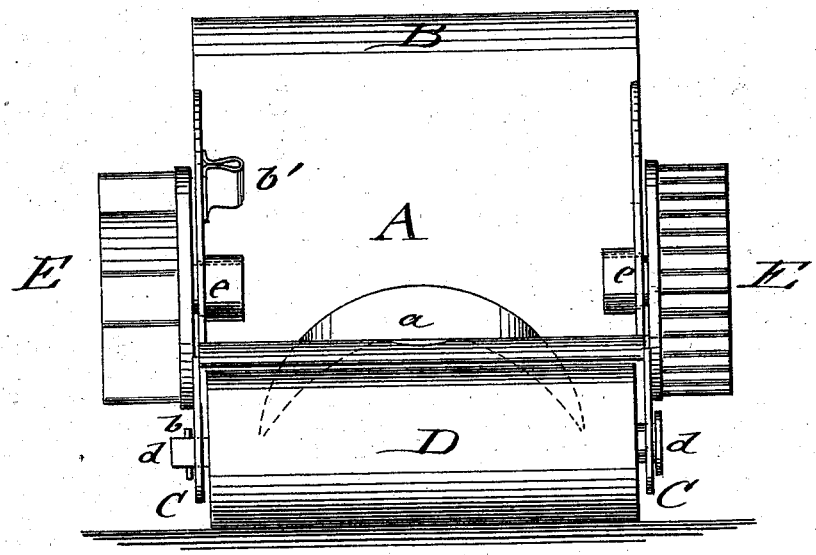

Be it known that I, FRANK MÖCKLI, of Galveston, in the county of Galveston and State of Texas, have invented a new and Improved Dough Kneader and Cutter, of which the following is a specification:

In the accompanying drawing, Figure 1 represents a side view, and Fig. 2 an end view, of my improved dough kneader and cutter.

Similar letters of reference indicate corresponding parts.

My invention relates to an improved instrument for rapidly and thoroughly kneading dough, and for scraping, rolling and cutting the same; and consists of a main part or body, of U shape, with curved lower part and ends, which main part is used for kneading the dough, while a knife at the upper end serves for scraping and cutting, a roller at the lower end for rolling the dough, and suitable cutters applied at the sides for stamping out cakes. A handle at the inside of the lower end serves, in connection with the upper curved end, for the convenient handling of the instrument during kneading.

In the drawing, A represents the main part or body of the dough-kneading instrument, which is made in the shape of a U, with curved lower part and ends, as shown in Fig. 1. The main part A is connected, by strengthening sides, so as to form a hollow body, and is made of tin or other suitable sheet metal. The curved base of main part A serves for kneading the dough, the instrument being held during this operation by one or both hands, the palm of one hand resting on the lower curved end, and the fingers in the curved handle *a*, which is soldered, riveted, or otherwise attached to the inside of body A, furnishing thereby a firm and secure hold for the hand. The other hand may be placed, for giving greater power to the kneader, on the upper end, which is bent into a curve of larger size than the lower one. The upper end is supplied with scraper or knife-blade B, for gathering the dough or cutting off a part, as required. The lower end of body A is further provided with projecting side standards or lugs C, between which the dough-roller D is applied in such a manner that the same may be detached if desired. The cross-pin *b*, used for fastening the shaft *d* of the roller D, is then placed into a socket, *b'*, at the inside of body A, to have it handy when the roller is inserted again for use. Dough-cutters E, of different shapes, are applied by central tubes to sockets *e*, at both sides of body A, and may be used with the body as handle part, or be detached from it and used separately.

The whole instrument, with its different parts, forms a very useful and convenient utensil for family, restaurant, and hotel use, as the various operations of kneading, scraping, rolling, and cutting the dough, may be quickly and neatly performed therewith.

Having thus described my invention, I claim as new, and desire to secure by Letters Patent—

The improved dough kneader, roller, and cutter, consisting of hollow U shaped main part A, with curved ends, having handle *a*, and scraper-blade B, detachable roller D, and dough-cutters E, all being arranged, constructed, and applied in the manner, and for the purpose described.

FRANK MÖCKLI.

Witnesses:
B. M. FLEMING,
E. ALBERS.